United States Patent
Oshio et al.

(10) Patent No.: US 7,300,191 B2
(45) Date of Patent: Nov. 27, 2007

(54) VEHICULAR LAMP

(75) Inventors: Hirohiko Oshio, Shizuoka (JP); Mitsuyuki Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/273,728

(22) Filed: Nov. 14, 2005

(65) Prior Publication Data

US 2006/0104077 A1    May 18, 2006

(30) Foreign Application Priority Data

Nov. 15, 2004  (JP) .............................. 2004-330332

(51) Int. Cl.
  *H01L 27/00*  (2006.01)
(52) U.S. Cl. ...................... 362/545; 362/800; 362/294; 362/373
(58) Field of Classification Search ................ 362/545, 362/800, 294, 373; 313/512
  See application file for complete search history.

(56) References Cited

U.S. PATENT DOCUMENTS 7,055,989 B2 * 6/2006 Galli ........................... 362/294

2004/0202005 A1  10/2004 Moisel
2005/0201100 A1 * 9/2005 Cassarly et al. ............ 362/317

FOREIGN PATENT DOCUMENTS

JP       9-17209       1/1997
KR       2004-87886    10/2004

* cited by examiner

*Primary Examiner*—Sandra O'Shea
*Assistant Examiner*—Anabel Ton
(74) *Attorney, Agent, or Firm*—Koda & Androlia

(57) ABSTRACT

A vehicular lamp 1 including a lamp unit 2, in which a light-emitting diode 2a is used as the light source, and a cover member 4, which is provided between the lamp unit 2 and an outer lens 3 of the lamp and located near the inside surface of the outer lens 3 so as to cover the lamp unit 2 except its light-emitting region. The cover member 4 is formed of a material that has good heat conductivity, and heat generated by the light-emitting diode 2a is transferred to the cover member 4 and to the outer lens 3, thus heating the outer lens.

4 Claims, 5 Drawing Sheets

VEHICULAR LAMP

BACKGROUND OF THE INVENTION

1. Field of the Invention

The present invention relates to a vehicular lamp and more particularly to a vehicular lamp that uses a light-emitting diode as its light source and as a means for melting snow and ice on the outer lens.

2. Description of the Related Art

In one type of the known vehicular lamps, a plurality of lamp units, each comprising, among others, a lens and a reflector and having a light-emitting diode (LED) used as its light source, are installed in the lamp body. A desired light distribution is obtained by combining a direct light emitting type lamp unit and a reflective light emitting type lamp unit.

Regarding the heat caused by lighting up the light-emitting diode, a heat sink or the like is used so that the generated heat is dissipated to the outside of the lamp chamber.

However, when the light-emitting diode is used as a light source, there is not much temperature increase by the radiation of light to the outer lens, and snow and ice on the outer surface of the outer lens do not easily melt.

More specifically, in a vehicular lamp with an incandescent light bulb, it is possible to melt the snow by the heat of the light ray transferred to the outer lens; however, light-emitting diodes do not produce heat in great deal. A radiation measure for that is nonetheless necessary, and there is a need to utilize the heat of light-emitting diodes effectively. Use of, for instance, a heat source such as a heater is conceivable to eliminate snow and ice from the outer lens of the lamp; but if the heat generated by the light-emitting diode can be actively used, it is preferable to use light-emitting diodes in terms of energy conservation and cost and the like.

BRIEF SUMMARY OF THE INVENTION

Accordingly, it is an object of the present invention to provide a vehicular lamp that has a heat radiation structure for preventing snow and ice on the outer lens of a vehicular lamp that uses light-emitting diodes as a light source.

The above object is accomplished by a unique structure of the present invention for a vehicular lamp that includes a lamp chamber formed by an outer lens and a lamp body, a lamp unit which is provided in the chamber and in which a light-emitting diode is used as a light source, and a cover member provided between the lamp unit and the outer lens so as to be near the inside surface of the outer lens so that the cover member covers the lamp unit except the light-emitting region when viewed from the front; and in the present invention, the cover member is made of a material having good heat conductivity, and heat generated by the light-emitting diode is transferred to the cover member.

In this structure of the present invention, the temperature of the outer lens can be kept high by the heat generated by the light-emitting diode and transferred to the cover member and then radiated to the outer lens. Accordingly, snow and ice on the outer lens are melted without using a heat source such as a heater.

In the present invention, a snow melting effect and the like is obtained by effectively using the heat from the light-emitting diode. Moreover, since the heat radiation structure of the present invention uses existing and known cover members (used as a necessary part), it is possible to lower the costs of vehicular lamps without making the structure of the vehicular lamp complicated.

In addition, in the present invention, the light-emitting diode can be mounted on a metal supporting member, and this supporting member is thermally connected to the cover member made of metal. In this structure, heat from the light-emitting diode is further effectively transferred from the supporting member to the cover member.

In addition, it can be structured so that a supporting member for attaching the lamp unit to the lamp body serves also as a cover member. With this structure, it is possible to further effectively reduce the number of parts.

In order to further improve the radiation effect of the heat to the outer lens, radiation fins that protrude toward the outer lens on the cover member can be provided.

DETAILED DESCRIPTION OF THE INVENTION

In the present invention, a vehicular lamp that uses a light-emitting diode as its light source melts the snow and ice on the outer lens by actively using the heat generated by the light-emitting diode, thus preventing the decrease in the illumination performance of the lamp in the winter season and in the cold regions.

Figure 1:
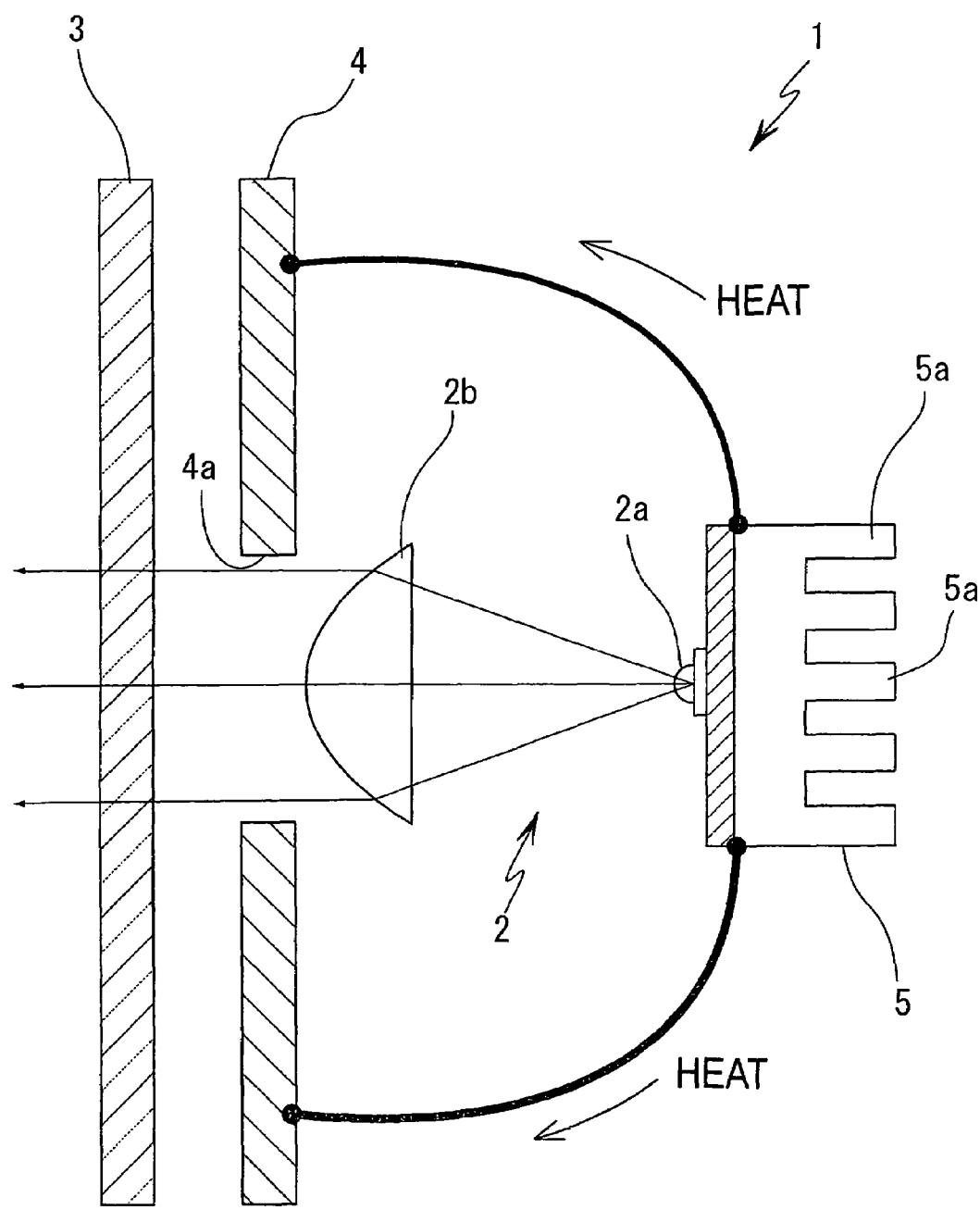
FIG. 1 is an explanatory illustration showing the basic structure of the vehicular lamp of the present invention.

As seen from FIG. 1, the vehicular lamp 1 of the present invention includes a lamp unit 2, which uses a light-emitting diode 2a, and a cover member 4, which is positioned near the inside surface of the outer lens 3 installed in front of that lamp unit 2 (the direction in which light is radiated (left side in FIG. 1) is defined as the "front").

In this lamp unit 2, light directly emitted from the light-emitting diode 2a passes, through a lamp unit lens 2b and goes through a translucent hole 4a of the cover member 4; and then the light is transmitted through the outer lens 3 and radiated forward. The structure of the lamp unit 2 is not limited to the one described above which is a direct light emitting type lamp unit; and a reflective light emitting type structure, described later, can also be used. In addition, a desired light distribution pattern is obtained by combining a plurality of the lamp units 2.

The outer lens 3 of the lamp is made of, for example, glass or a transparent synthetic resin. In other words, the outer lens 3 is a transparent member which is translucent and in which no lens steps are formed.

The cover member 4 is provided between the outer lens 3 and the lamp unit 2. When viewed from the front in the direction of the optical axis of the lamp, the cover member 4 is disposed near the inside surface of the outer lens 3 so that it covers an area except the light-emitting region of the lamp unit 2; in other words the cover member 4 covers the lamp unit 2 except the light-emitting region or the area in front of the of lamp unit lens 2b of the lamp unit 2.

In order to dissipate the heat generated by the light-emitting diode 2a, a radiating means 5 is provided. The radiating means 5 can be a heat sink that has a plurality of radiation fins 5a.

The cover member 4 is made of a material that has good heat conductivity, such as metal, ceramic, etc. and is thermally connected to the radiating means 5.

Some of the heat generated by the light-emitting diode 2a is transferred to the cover member 4 and further to the outer lens 3.

The cover member 4 (e.g., a decorative member such as an extension) conceals the internal structure of the lamp chamber so that the internal structure of the lamp chamber is not visible from the outside it; and in the present invention, the cover member 4 (which is an existing and known part) is used as a heat transferring means, thus simplifying the lamp structure without using additional parts.

Figure 2:
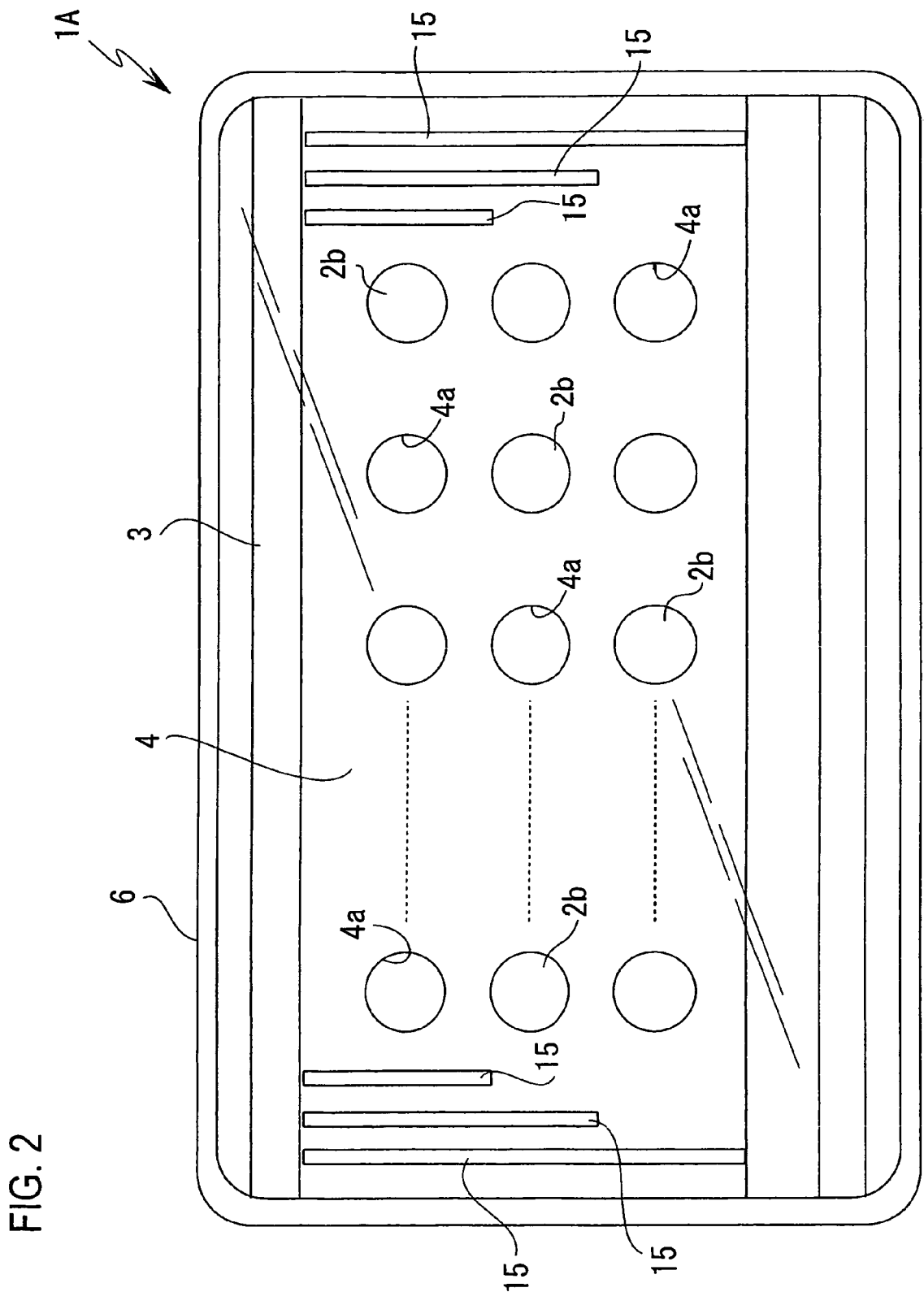
FIG. 2 is a front view of an example of the vehicular headlamp according to the present invention.
Figure 3:
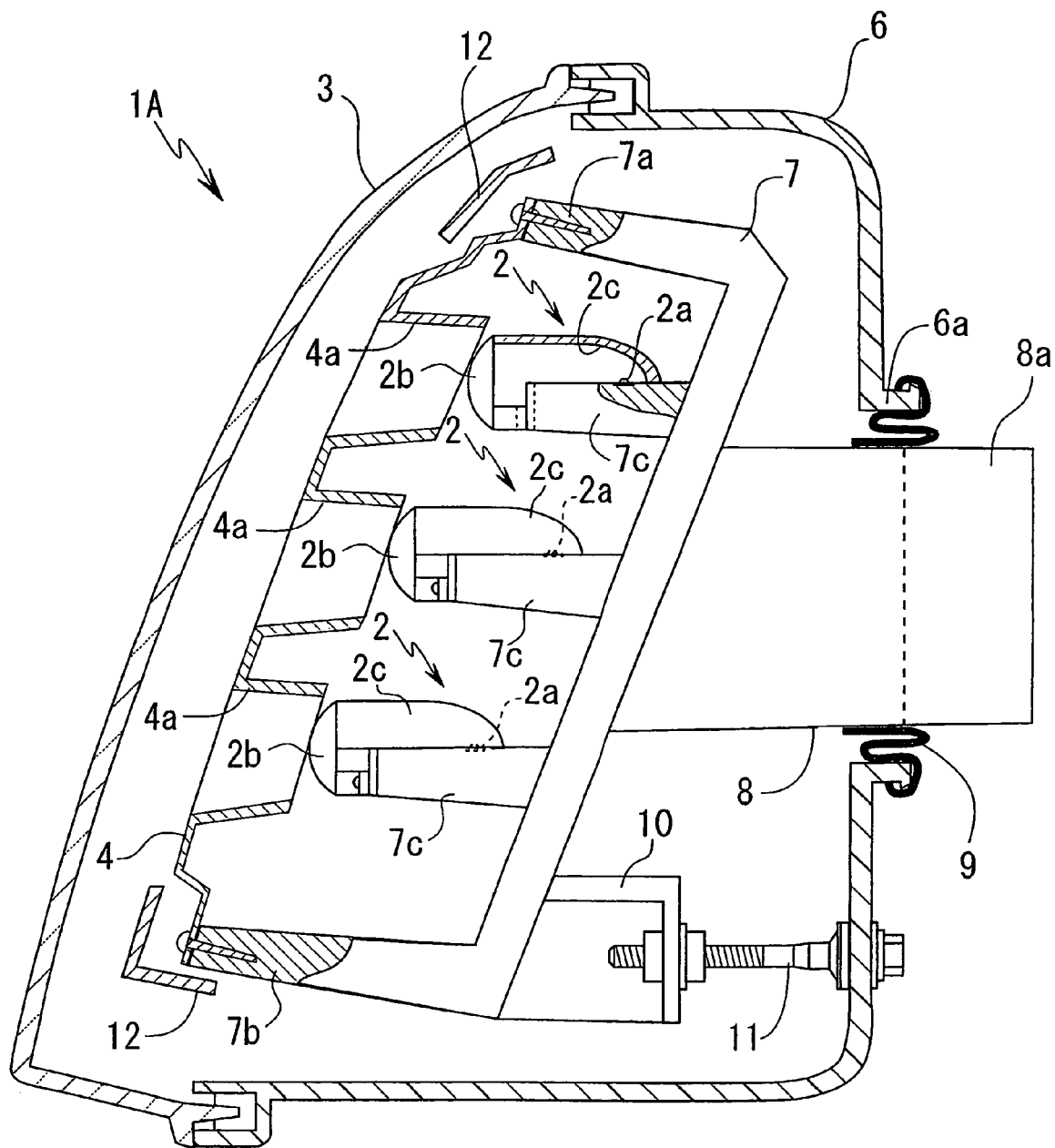
FIG. 3 is a cross-sectional view of the lamp of FIG. 2 with a part thereof cut away.

FIG. 2 and FIG. 3 show a vehicular headlamp to which the present invention is applied.

As seen from FIG. 2 which is a front view of the vehicular headlamp 1A, a plurality of lamp units are installed within the lamp chamber formed by the outer lens 3 and a lamp body 6.

The cover member 4 is positioned on the inner side of the outer lens 3, and light from each one of the lamp units 2 passes through each one of the plurality of translucent holes 4a and is radiated forward.

FIG. 3 shows the inside of the vehicular headlamp 1A.

The lamp units 2 are attached to a metal supporting member 7. The cover member 4 is fastened and fixed by, for instance, screws to the upper front end portion 7a and to the lower front end portion 7b of the supporting member 7.

The shown lamp unit 2 has a reflective light emitting type structure, so that light from the light-emitting diode 2a passes through the lamp unit lens 2b after being reflected by a reflector 2c and then passes the translucent hole 4a of the cover member 4, and it is radiated to the outside through the outer lens 3.

In the shown example, the lamp units 2 are attached to a plurality of fitting portions 7c which protrude forward from the inside surface of the supporting member 7, and heat from the light-emitting diodes 2a is conducted to the fitting portions 7c.

A heat sink 8 is formed on the back of the supporting member 7. The exterior portion 8a (the area in which the radiation fins are formed) of the heat sink 8 protrudes to the outside from an opening of the cylindrical portion 6a formed on the rear wall of the lamp body 6. The heat sink 8 is supported at a part thereof by the lamp body 6 using a rubber retainer 9 which is fitted around the outside of the cylindrical portion 6a of the lamp body 6.

The supporting member 7 is attached to the lamp body 6 using an aiming adjustment mechanism which is for specifying the direction of the radiation of the light, so that the tilting posture of the supporting member 7 is changed. More specifically, connecting portions 10 (only one is shown in FIG. 3) formed on the rear wall of the supporting member 7 are connected to the rear wall of the lamp body 6 by aiming screws 11 (only one is shown in FIG. 3). Angle adjustment of the supporting member 7 is performed by, as is well known, increasing/decreasing the amount that the screws 11 are screwed into the connecting portions 10, thus changing the distance between the supporting member 7 (and the cover member 4) and the lamp body 6.

Blind members 12 are provided near the upper and lower portions of the cover member 4 so that they conceal the joining portion of the cover member 4 and the supporting member 7. The joining portions are thus not visible from the outside. The blind members 12 can be thermally contacted to the supporting member 7, thus increasing the heat radiation effect.

In the above-described structure of the headlamp of the present invention, heat generated when the light-emitting diodes 2a are lit travels first to the supporting member 7. Then, some of that heat is transferred to the head sink 8 in the back and radiated outside the lamp from the radiation fins, and some of the heat that was transferred to the supporting member 7 travel to the front from the joining portions 7a and 7b to the cover member 4. The cover member 4 is made of metal (being an aluminum press molded part or the like); as a result, heat reached to the cover member 4 is next transferred to the outer lens 3, thus heating the outer lens, and melting the snow and ice on the outer lens 3.

In a vehicular lamp having a structure that the lighting circuit of the light-emitting diode is provided in the lamp chamber, it can be designed so that the heat generated by the lighting circuit is transferred to the cover member 4. In addition, the cover member 4 can be thermally connected to the supporting member 7 (or the cover member 4 can be connected to the supporting member 7 so that heat is transferred from the supporting member 7 to the cover member 4) with an intermediate member disposed in between and not directly fixed to the supporting member 7. In order to efficiently transfer the heat to the outer lens, it is preferable that the distance between the outer lens and the cover member be as short as possible.

In the above-described examples, some of the heat reached to the supporting member 7 is transferred to the cover member 4 to warm up the outer lens 3, and the supporting member 7 and the cover member 4, separate elements, are joined together. However, the supporting member and the cover member can be formed as a single unit.

Figure 4:
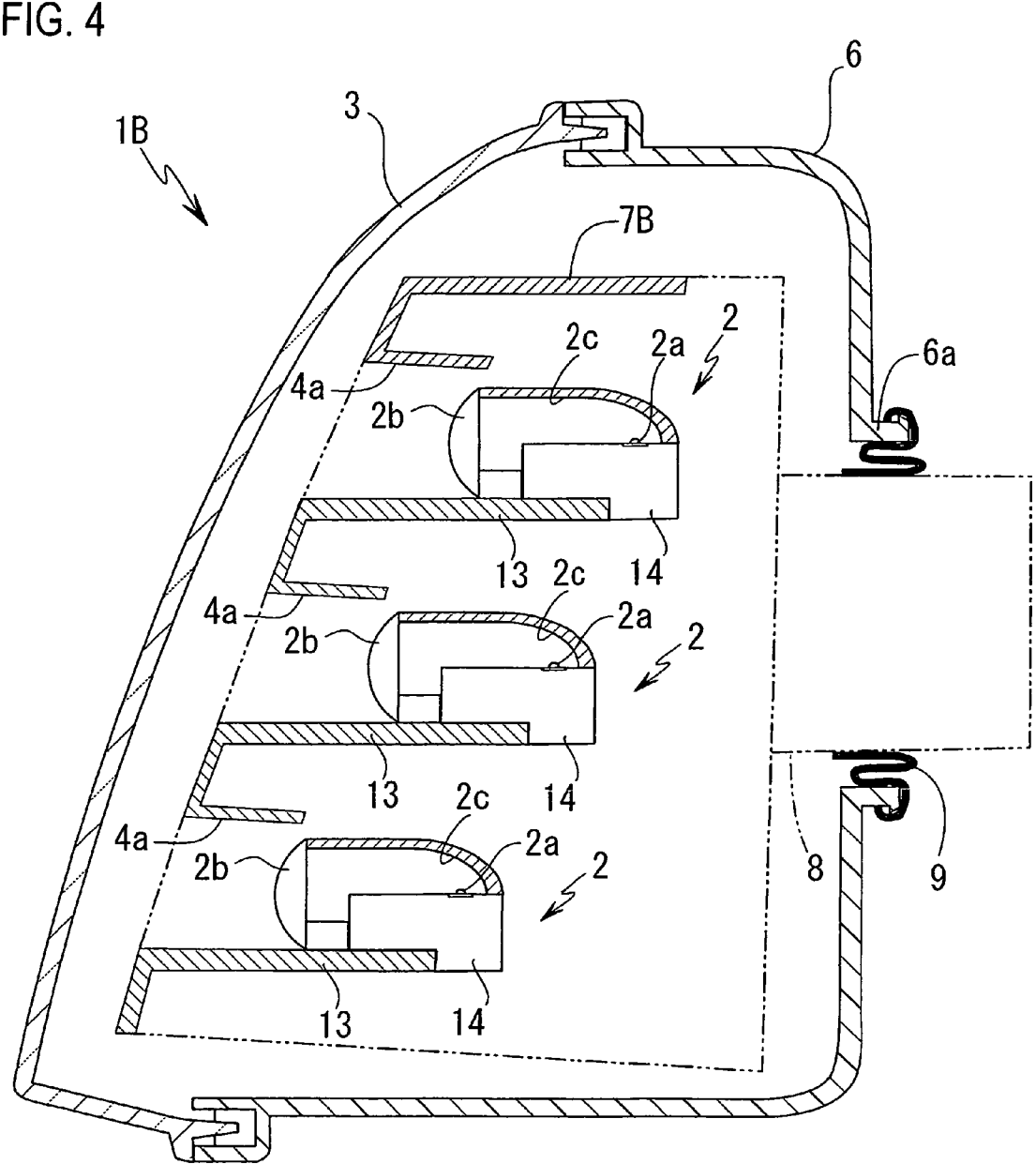
FIG. 4 is a cross-sectional view of the vehicular headlamp according to another example of the present invention.

FIG. 4 shows a vehicular headlamp 1B in which the supporting member and the cover member are integrated. In the following, the vehicular headlamp 1B will be described mainly for the portions which differ from the vehicular headlamp 1A described above; and the reference numerals which are the same as those used in the above will be used for portions having the same function as those of the vehicular headlamp 1A.

In the vehicular headlamp 1B of FIG. 4, the lamp units 2 are provided in a single supporting member 7B. In addition to the function of having the lamp units 2, the supporting member 7B functions also as a cover member 4. In other words, the supporting member 7B is made of aluminum die-cast, and the lamp units 2 are respectively provided on the fitting portions 13 of the supporting member 7B so that the lamp units 2 are in the translucent holes 4a formed in the front portion of the supporting member 7B.

In each lamp unit 2, light of the light-emitting diode 2a is reflected by the reflector 2c and passes through the front lamp unit lens 2b, and then it passes the translucent hole 4a and is radiated to the outside through the outer lens 3. Each light-emitting diode 2a is disposed on a metal supporting block 14, and this supporting block 14 is fixed to the fitting portion 13 of the supporting member 7B.

A heat sink can be used in the vehicular headlamp 1B. The heat sink can be provided for each one of the supporting blocks 14. Alternately, a single heat sink can be thermally connected to the supporting blocks so that heat is radiated all at once.

As seen from the above, in the vehicular headlamp 1B, heat generated when the light-emitting diodes 2a are lit travels to the meal supporting blocks 14, and then some of that heat is transferred to the fitting portions 13. The heat reached to the front portion of the supporting member 7B from the fitting portions 13 is transferred to the outer lens 3, thus heating the outer lens 3, and melting the snow and ice on the outer lens 3.

Since the supporting member 7B functions as the cover member (4), the number of parts can be reduced. Furthermore, with the use of a supporting member (7B) on which alumite processing, painting and the like is applied, the thermal emissivity is high, and heat can be more efficiently transferred to the outer lens.

Further, in the present invention, the cover member or the supporting member (which function, as described above as the cover member) can be formed with radiation fins which protrude toward the outer lens. The heat radiation effect toward the outer lens can further increase by the radiation fin.

Figure 5:
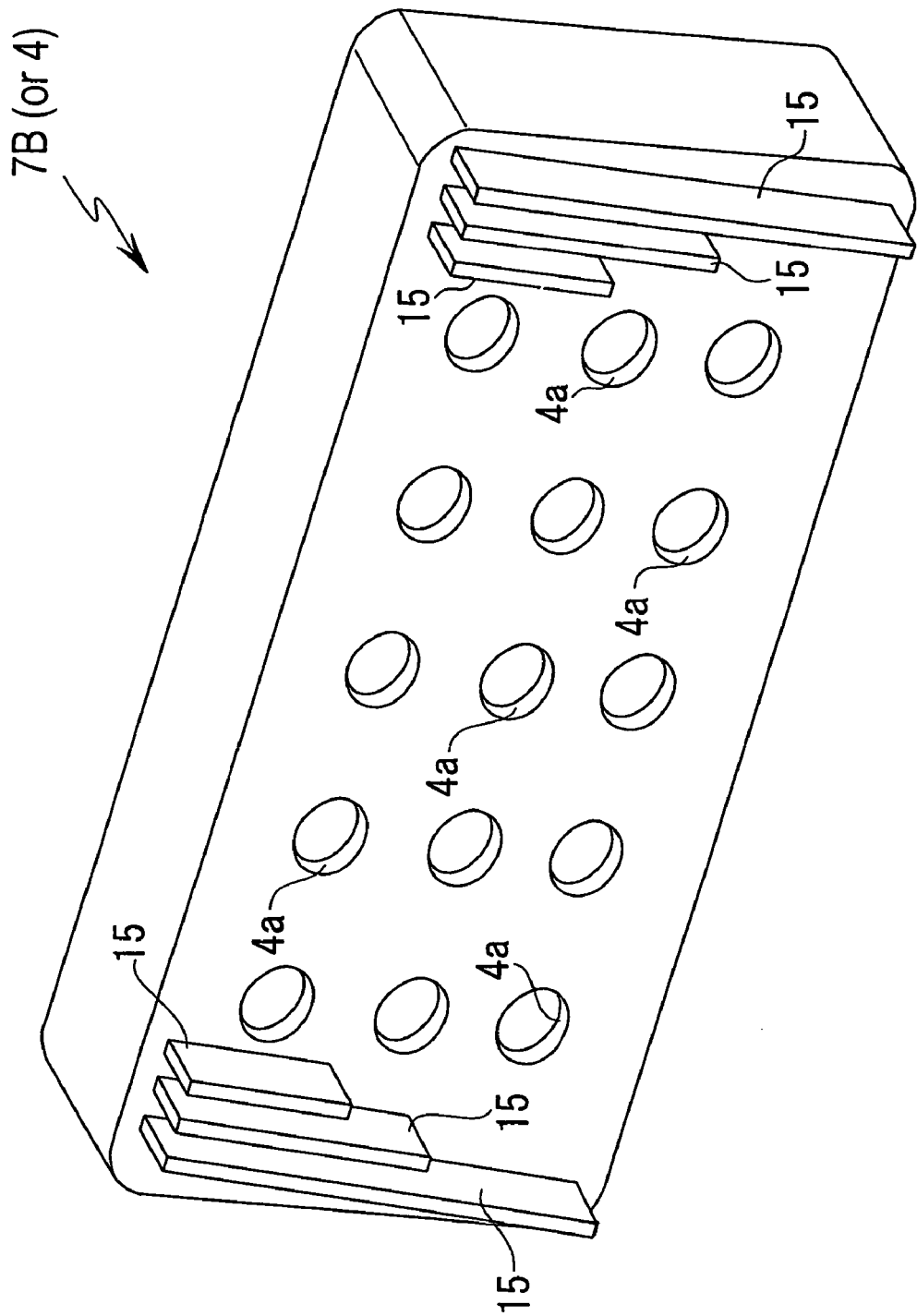
FIG. 5 is a perspective illustration showing radiation fins formed on the supporting member.

In the structure of FIG. 5, the supporting member 7B (that functions also as the cover member 4) is provided with a plurality of radiation fins 15 that face and protrude toward the inside surface of the outer lens 3, so that heat reached to the supporting member 7B is dissipated from the radiation fins 15 toward the outer lens 3. As to the locations where the radiation fins are formed, it is preferable to take into account the optical effects of the lamp units 2. The radiation fins 15 are thus not formed near the openings of the translucent holes 4a.

As seen from the above, according to the present invention, the heat generated by the light-emitting diode can be effectively used for melting the snow and ice on the flont outer lens of a vehicular lamp, so that the forward visibility and safety running in the winter season and in the cold regions are ensured.

The invention claimed is:

1. A vehicular lamp comprising:
   a lamp chamber formed by an outer lens and a lamp body,
   a lamp unit provided in the lamp chamber and having a light-emitting diode saving as a light source thereof, and
   a cover member provided between the lamp unit and the outer lens and disposed near an inside surface of the outer lens so that the cover member covers an area except a light-emitting region of the lamp unit; wherein
   the cover member is formed of a material having heat conductivity, and
   heat generated by the light-emitting diode is transferred to the cover member; and further comprising:
   a support member provided thereon with the light-emitting diode, the support member being made of a metal and thermally connected to the cover member; and
   a radiation fin formed on the cover member and protruding toward the outer lens.

2. The vehicular lamp according to claim 1, wherein the cover member is made of metal.

3. The vehicular lamp according to claim 1, further comprising a supporting member provided thereon with the lamp unit and coupled to the cover member.

4. The vehicular lamp according to claim 1, further comprising a radiation fin formed on the cover member and protruding toward the outer lens.

* * * * *